(12) United States Patent  (10) Patent No.: US 7,446,818 B2
Chao  (45) Date of Patent: Nov. 4, 2008

(54) APPARATUS AND RELATED METHOD FOR FILM MODE DETECTION USING MOTION ESTIMATION

(75) Inventor: Po-Wei Chao, Taipei Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 552 days.

(21) Appl. No.: 10/905,755

(22) Filed: Jan. 19, 2005

(65) Prior Publication Data

US 2005/0157789 A1  Jul. 21, 2005

(30) Foreign Application Priority Data

Jan. 20, 2004 (TW) .............. 93101594 A

(51) Int. Cl.
H04N 7/01 (2006.01)
H04N 7/12 (2006.01)
H04N 11/02 (2006.01)
H04N 11/04 (2006.01)
H04N 11/20 (2006.01)
H04N 5/14 (2006.01)
H04N 5/46 (2006.01)
H04N 9/64 (2006.01)

(52) U.S. Cl. .................. 348/558; 348/448; 348/443; 348/449; 348/458; 348/459; 348/700; 348/701; 375/240.16

(58) Field of Classification Search ............. 348/558, 348/448, 443, 449, 458, 459, 452, 700, 701; 375/240.12–240.16
See application file for complete search history.

(56) References Cited

U.S. PATENT DOCUMENTS

| 4,982,280 | A |   | 1/1991  | Lyon et al. |   |
|-----------|---|---|---------|-------------|---|
| 5,291,280 | A |   | 3/1994  | Faroudja et al. |   |
| 5,625,421 | A |   | 4/1997  | Faroudja et al. |   |
| 5,689,301 | A | * | 11/1997 | Christopher et al. | 348/97 |
| 5,828,786 | A | * | 10/1998 | Rao et al. | 382/236 |
| 6,014,182 | A |   | 1/2000  | Swartz |   |
| 6,201,577 | B1 |  | 3/2001  | Swartz |   |
| 6,340,990 | B1 | * | 1/2002 | Wilson | 348/448 |
| 6,549,668 | B1 | * | 4/2003 | Pezzoni et al. | 382/236 |
| 6,580,463 | B2 |  | 6/2003  | Swartz |   |
| 6,839,094 | B2 | * | 1/2005 | Tang et al. | 348/607 |
| 6,990,148 | B2 | * | 1/2006 | Yang | 375/240.16 |
| 7,075,581 | B1 | * | 7/2006 | Ozgen et al. | 348/448 |
| 7,116,828 | B2 | * | 10/2006 | Wells | 382/233 |
| 7,170,562 | B2 | * | 1/2007 | Yoo et al. | 348/452 |
| 7,233,361 | B2 | * | 6/2007 | Yang et al. | 348/441 |
| 7,274,404 | B1 | * | 9/2007 | He et al. | 348/448 |
| 7,277,581 | B1 | * | 10/2007 | Lightstone et al. | 382/181 |
| 7,286,185 | B2 | * | 10/2007 | Wong et al. | 348/452 |
| 2002/0001347 | A1 | * | 1/2002 | Rhee | 375/240.16 |
| 2002/0131499 | A1 | * | 9/2002 | De Haan et al. | 375/240.12 |
| 2003/0122369 | A1 | * | 7/2003 | Chenel | 283/74 |
| 2003/0161403 | A1 | * | 8/2003 | Yang | 375/240.16 |
| 2004/0057517 | A1 | * | 3/2004 | Wells | 375/240.16 |
| 2004/0070686 | A1 | * | 4/2004 | Jung et al. | 348/448 |
| 2004/0189877 | A1 | * | 9/2004 | Choi et al. | 348/700 |

(Continued)

*Primary Examiner*—Brian P. Yenke
(74) *Attorney, Agent, or Firm*—Winston Hsu

(57) ABSTRACT

An apparatus and related method for detecting film mode using motion estimation. In the method, a pixel region in each field is sequentially chosen as a target pixel region in a target field to be processed with a motion estimation operation.

23 Claims, 5 Drawing Sheets

U.S. PATENT DOCUMENTS

2005/0036063 A1* 2/2005 Chen et al. .................. 348/452
2006/0061690 A1* 3/2006 De Haan et al. ............. 348/625
2006/0209957 A1* 9/2006 Riemens et al. ........ 375/240.16

* cited by examiner

APPARATUS AND RELATED METHOD FOR FILM MODE DETECTION USING MOTION ESTIMATION

BACKGROUND OF INVENTION

1. Field of the Invention

The present invention relates to a video system, and more specifically, to a film mode detector of the video system.

2. Description of the Prior Art

In conventional interlaced scanning, a frame is composed of two fields, which are an odd field, and an even field. The frame is displayed by displaying the two fields in an interlacing sequence.

In progressive scanning (non-interlaced scanning), an odd field and an even field are combined into one frame, and then the frame is scanned at double horizontal scan frequency in sequence, so that the quality of the image (frame) is improved.

Before combining two fields into one frame, it is necessary to detect the relationship between each field in the video data. This means it is necessary to detect whether the video data is film mode data, for example, the video data can be 3-2 pull down or 2-2 pull down or other. Then, the video data is appropriately de-interlaced according to result of the film mode detection. If the video data is film mode data, it is necessary to appropriately combine two adjacent fields. If the video data is not film mode data, it is necessary to perform an interpolation operation on each field to properly de-interlace each field. Please refer the methods disclosed in U.S. Pat. No. 4,982,280 and U.S. Pat. No. 6,580,463 for the prior art.

SUMMARY OF INVENTION

It is therefore one of objectives of the claimed invention to provide an apparatus and a method for detecting film mode using motion estimation.

According to the claimed invention, an apparatus and a method for detecting film mode are disclosed. The apparatus comprises at least one motion estimation module and a film mode detector. Each the motion estimation module comprises: a pixel motion estimator receiving a first field and a second field in the video data, and performing a motion estimation operation on a target pixel region in the first field and the second field to generate a pixel motion determining value corresponding to the target pixel region; and a field motion estimator coupled to the pixel motion estimator for generating a field motion determining value corresponding to the first field according to the pixel motion determining values. The film mode detector coupled to the at least one motion estimation module is utilized for determining the film mode of the video data according to the field motion determining value respectively corresponding to the first field.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
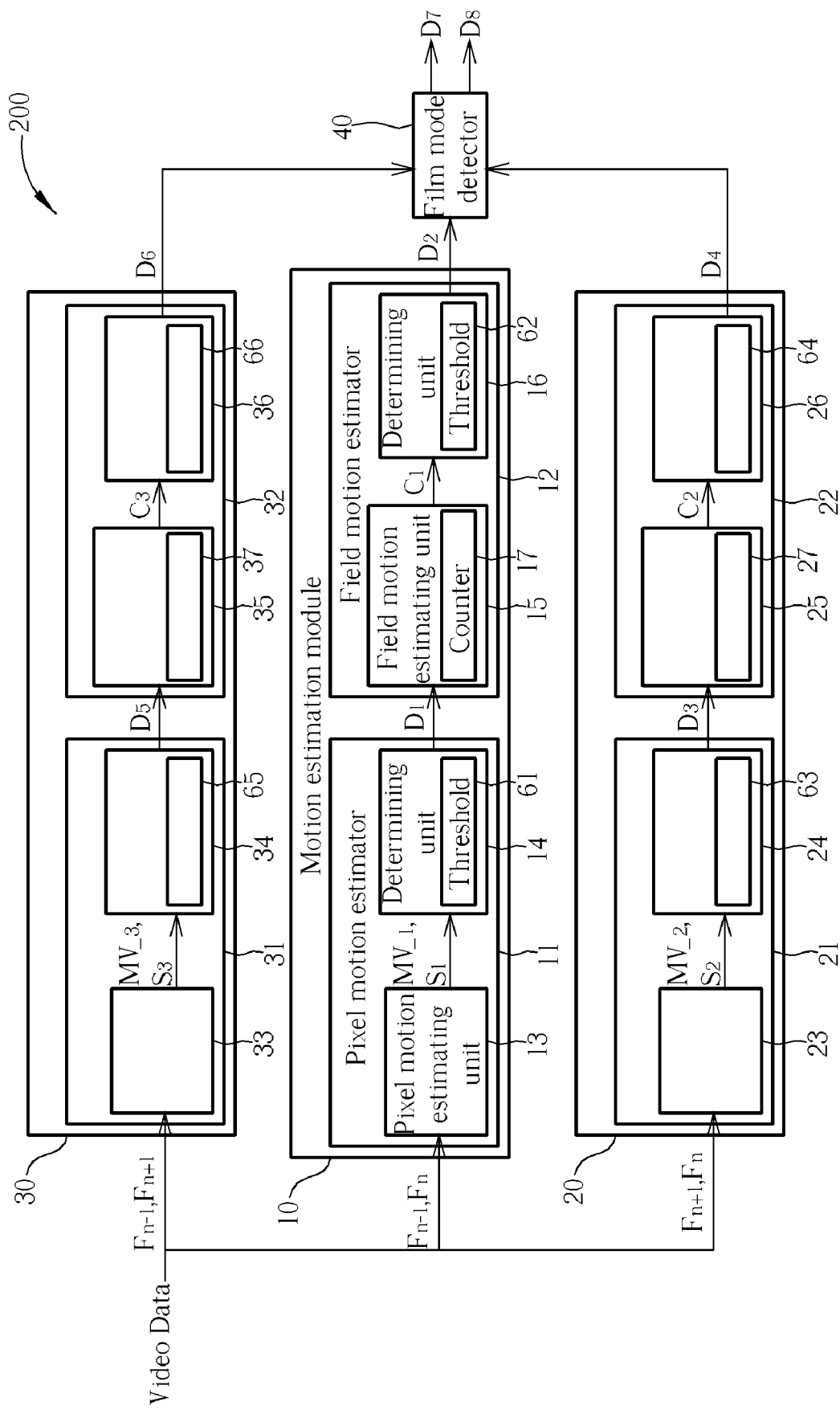
FIG. 1 is a functional diagram according to an embodiment of the present invention.

Please refer to FIG. 1. FIG. 1 is a functional diagram of a film mode detection apparatus 200 according to an embodiment of the present invention. Generally speaking, video data in interlaced scanning is composed of a plurality of fields. The apparatus 200 is utilized for determining film mode of the video data by performing a motion estimation operation on fields. In an embodiment, the apparatus 200 comprises three motion estimation modules 10, 20 and 30, and a film mode detector 40. The motion estimation modules 10, 20 and 30 can have the same structure. The motion estimation module 10 is given as an example and is described as follows. The motion estimation module 10 comprises a pixel motion estimator 11 and field motion estimator 12. The input end of the pixel motion estimator 11 receives two fields respectively as a first field and a second field. The pixel motion estimator 11 is utilized for dividing the first field into a plurality of target pixel regions. For each target pixel region, the pixel motion estimator 11 performs a motion estimation operation on the target pixel region in the first field and the second field to generate a pixel motion determining value $D_1$ corresponding to the target pixel region according to the result of the motion estimation operation. In another embodiment of the present invention, the target pixel region can only contain a pixel and can be called a "target pixel".

In an embodiment, the pixel motion estimator 11 comprises a pixel motion estimating unit 13 and a first determining unit 14. The pixel motion estimating unit 13 is utilized for performing a motion estimation operation on each target pixel in the first field to estimate a possible position of the target pixel region in the second field, and calculate the difference between the possible position and the position of the target pixel region to generate a estimating result of the motion estimation operation. The estimating result comprises motion vector MV_1 and a similarity value (or a difference value) $S_1$. The first determining unit 14 can be a first threshold 61. The first determining unit 14 is coupled to the pixel motion estimating unit 13 for generating the pixel motion determining value $D_1$ corresponding to the target pixel according to the motion vector MV_1, the similarity value $S_1$, and a first threshold value. The pixel motion determining value $D_1$ represents whether the target pixel has motion. If the motion vector MV_1 is 0 and the similarity value $S_1$ is greater than the first threshold value (or the difference value is smaller than the first threshold value), it means the target pixel (region) has no motion. When the pixel motion determining value $D_1$ is set to be 1, it means the target pixel has motion.

The field motion estimator 12 is coupled to the pixel motion estimator 11 for generating a field motion determining value $D_2$ corresponding to the first field according to each pixel motion determining value $D_1$ respectively corresponding to each target pixel in the first field. In an embodiment, the field motion estimator 12 comprises a field motion estimating unit 15 and a second determining unit 16. The field motion estimating unit 15 comprises a counter 17 for generating a first accumulating value $C_1$ corresponding to the first field according to each pixel motion determining value $D_1$ respectively corresponding to each target pixel in the first field. The first accumulating value $C_1$ represents the number of target pixels in the first field that have motion. For example, if a pixel motion determining value $D_1$ corresponding to a target pixel in the first field is 1, the first accumulating value $C_1$ is increased by 1; if the pixel motion determining value $D_1$ is 0, it means the target pixel has no motion, hence, the first accumulating value $C_1$ is not changed. According to the above-mentioned description, the first accumulating value $C_1$ can be generated according to all target pixels in the first field.

The second determining unit 16 is coupled to the field motion estimating unit 15 for generating a field motion determining value $D_2$ according to the first accumulating value $C_1$ from the field motion estimating unit 15. The second determining unit 16 can be a second threshold 62 for comparing the first accumulating value $C_1$ and a second threshold value to generate the field motion determining value $D_2$ corresponding to the first field. The field motion determining value $D_2$ represents whether the first field has field motion. When the field motion determining value $D_2$ is greater than the second threshold value, it means the first field has field motion, hence, the field motion determining value $D_2$ is set to be 1. Otherwise, it means the first field has no field motion, and therefore the field motion determining value $D_2$ is set to be 0.

In another embodiment, the apparatus 200 receives three adjacent fields from the video data respectively as a previous field $F_{n-1}$, a middle field $F_n$ and a following field $F_{n+1}$. As shown in FIG. 1, the motion estimation module 10 receives the field $F_n$ and the field $F_{n-1}$ respectively as the first field and the second field in the previous description. The motion estimation module 10 further generates a field motion determining value $D_2$ according to each pixel motion determining value $D_1$. In the same manner, the motion estimation module 20 receives the field $F_n$ and the field $F_{n+1}$ respectively as the first field and the second field in the previous description and generates a field motion determining value $D_4$ according to each pixel motion determining value $D_3$. The motion estimation module 30 receives the field $F_{n-1}$ and the field $F_{n+1}$ respectively as the first field and the second field in the previous description and generates a field motion determining value $D_6$ according to each pixel motion determining value $D_5$.

The film mode detector 40 is coupled to the motion estimation modules 10, 20 and 30 for generating a seventh determining value $D_7$ and an eighth determining value $D_8$ according to field motion determining values ($D_2$, $D_4$, $D_6$). The seventh determining value $D_7$ represents whether the field $F_n$ of video data is film mode data (eg: a 3-2 pull down film mode or a 2-2 pull down film mode or other). The eighth determining value $D_8$ represents whether it is appropriate to combine the field $F_n$ with the field $F_{n-1}$ or the field $F_{n+1}$.

The above-mentioned description illustrates a preferred embodiment of the present invention. Additionally, in another embodiment of the present invention, it is applicable to implement the function for film mode detection with only one motion estimation module 10 and the film mode detector 40. Meanwhile, the first field $F_n$ and the second field $F_{n-1}$ are received as input. In the present embodiment, it is applicable to determine whether the video data comprising the first field $F_n$ is film mode data. It is also applicable to determine whether it is appropriate to combine the first field $F_n$ and the second field $F_{n-1}$.

Figure 2:
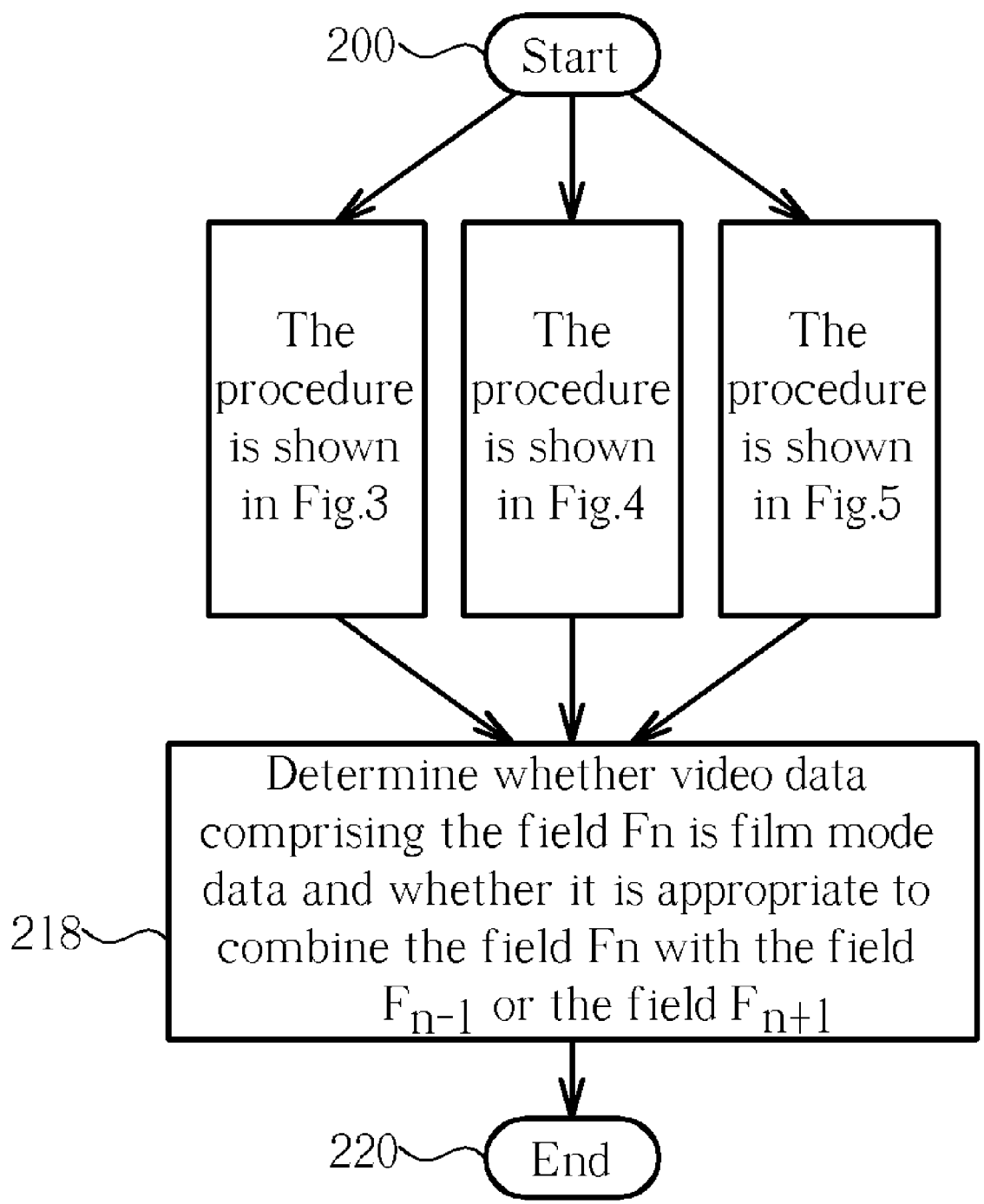
FIG. 2, FIG. 3, FIG. 4 and FIG. 5 are flowcharts illustrating the method according to the embodiment of the present invention.
Figure 3:
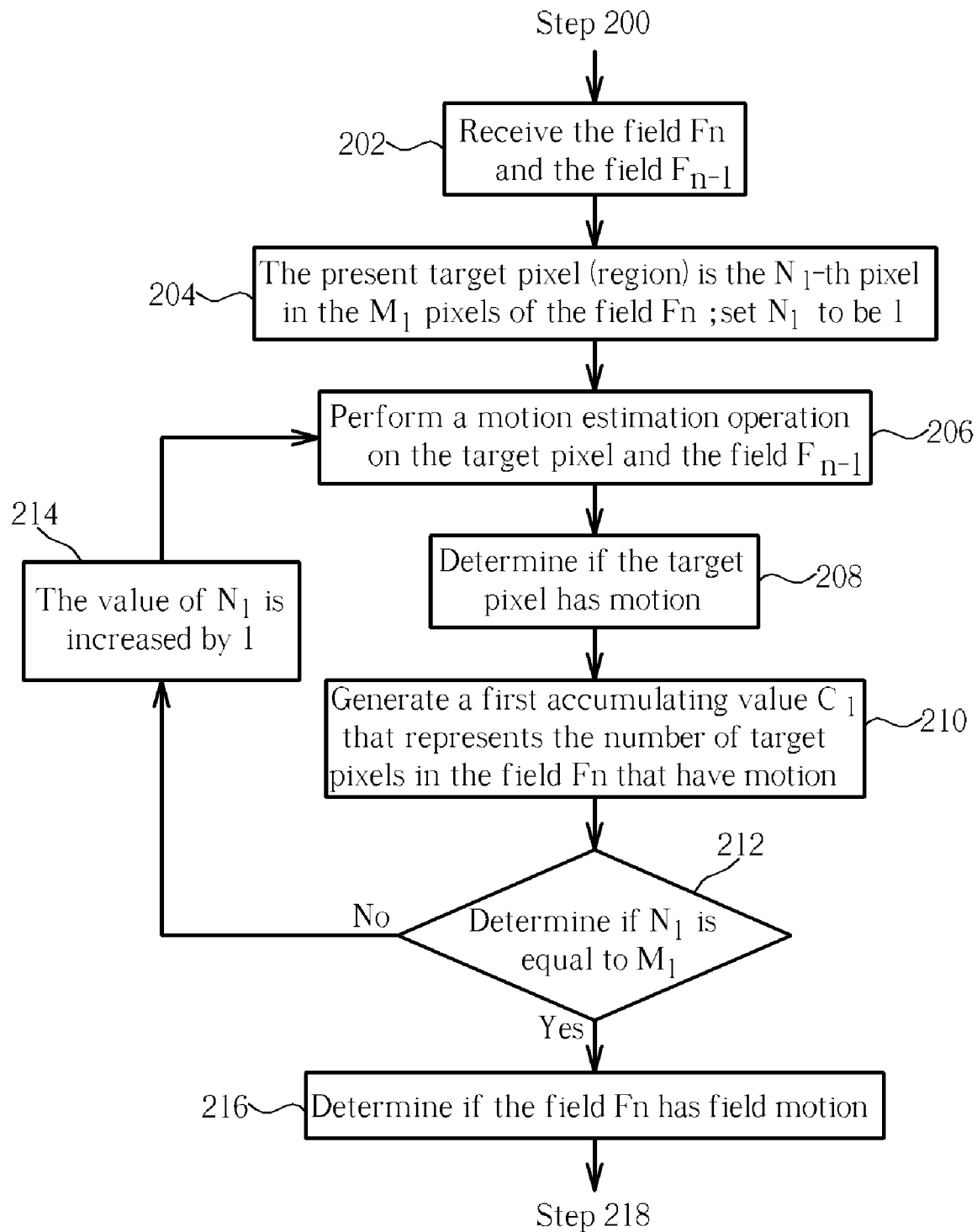
Figure 4:
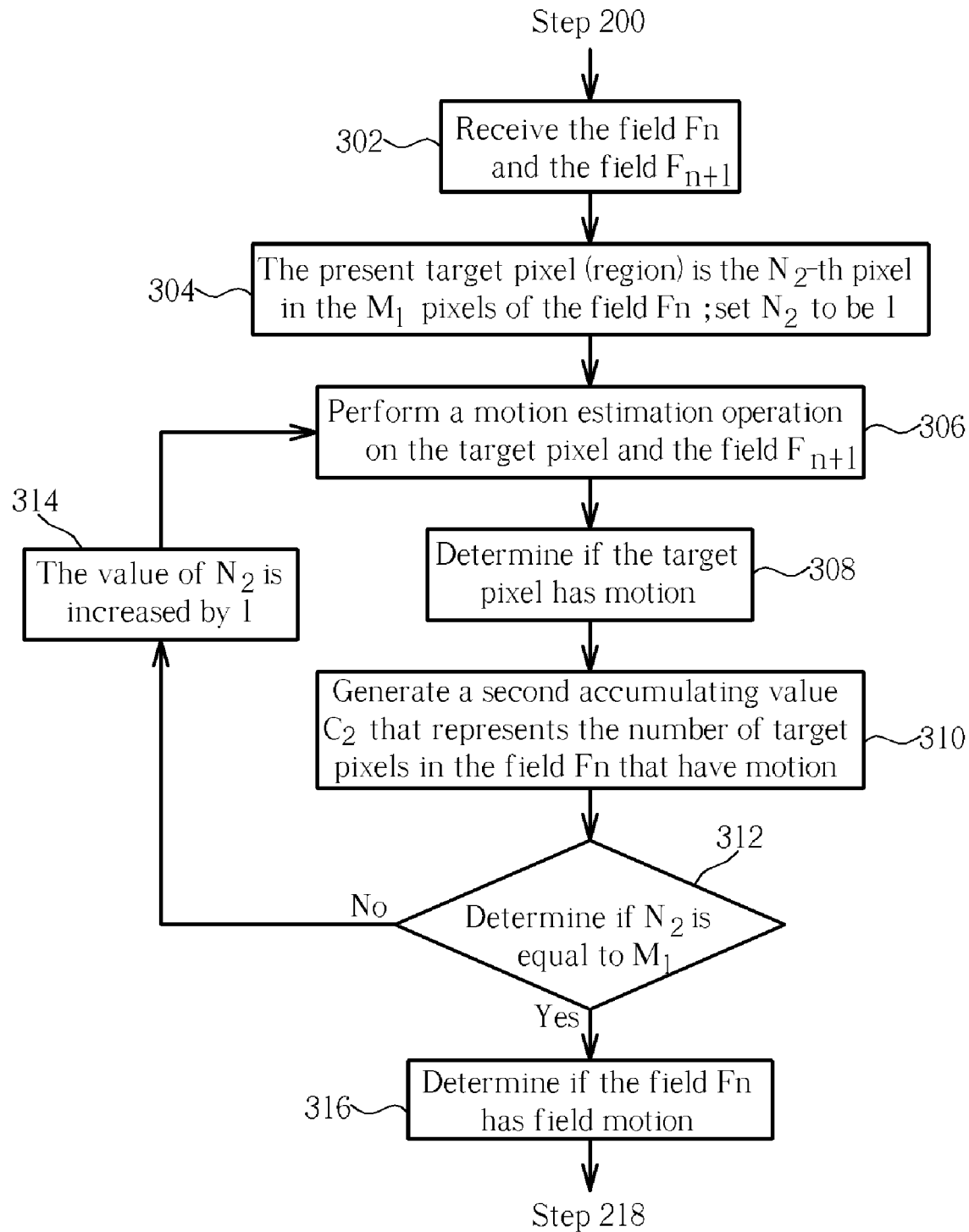
Figure 5:
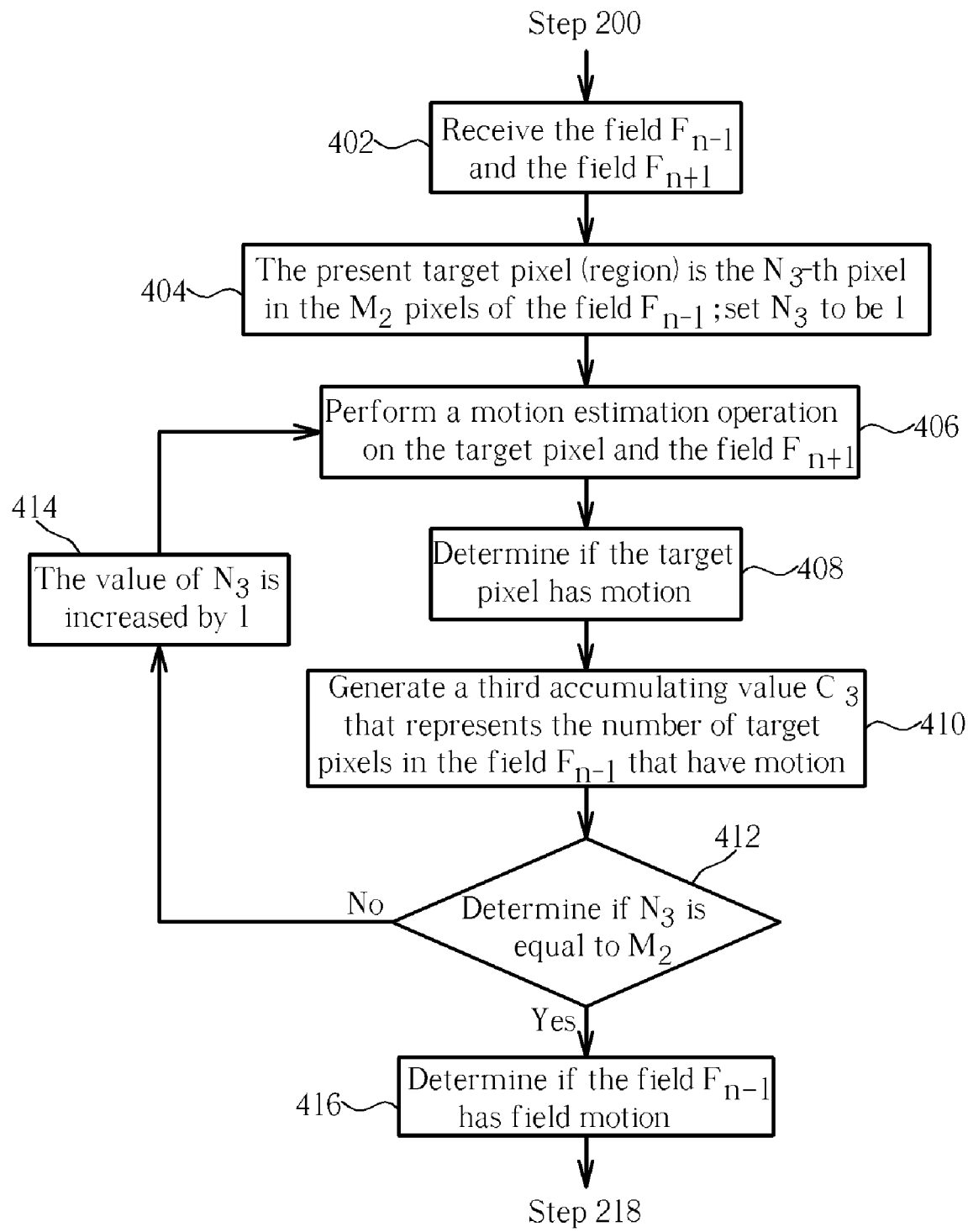

FIG. 2, FIG. 3, FIG. 4 and FIG. 5 are flowcharts illustrating the method according to the present invention. The three procedures in FIG. 2 are respectively shown in FIG. 3, FIG. 4 and FIG. 5. The present method comprises receiving three adjacent fields from the video data respectively as a previous field $F_{n-1}$, a middle field $F_n$ and a following field $F_{n+1}$. As shown in FIG. 2, steps from step 202 to step 216, steps from step 302 to step 316, and steps from step 402 to step 416 are respectively utilized for implementing a motion estimation procedure. A motion estimation procedure is described as follows:

Step 202: Receive the field $F_n$ and the field $F_{n-1}$ from the video data as input;

Step 204: Choose a pixel (region) in the field $F_n$ containing $M_1$ pixels as a target pixel (region), and $N_1$ is an assigned number of the target pixel (region); set $N_1$ to be 1;

Step 206: Perform a motion estimation operation on the target pixel and the field $F_{n-1}$ to estimate the possible position of the target pixel in the field $F_{n-1}$;

Step 208: For each target pixel, generate a pixel motion determining value $D_1$ corresponding to the target pixel. The pixel motion determining value $D_1$ represents whether the target pixel has motion;

Step 210: Count the pixel motion determining value $D_1$ to produce a first accumulating value $C_1$;

Step 212: Determine if $N_1$ is equal to $M_1$; if so, go to step 216; if not, go to step 214;

Step 214: The value of $N_1$ is increased by 1; go to step 206;

Step 216: Determine whether the field $F_n$ has field motion.

Each step from step 302 to step 316 is respectively similar to each step from step 202 to step 216. Step 302 is used to receive the field $F_n$ and the field $F_{n+1}$ as input. Each step from step 402 to step 416 is also respectively similar to each step from step 202 to step 216. Step 402 is used to receive the field $F_{n-1}$ and the field $F_{n+1}$. The following steps of the method are described as follows:

Step 218: Determine the film mode of the video data according to the field motion determining values $D_2$, $D_4$ and $D_6$.

It is applicable to implement the function for film mode detection with only one motion estimation procedure, such as steps from step 202 to step 216, and step 200, step 218 and step 220. Step 202 is used to receive the field $F_n$ and the field $F_{n-1}$ as input. Therefore, it is applicable to determine whether the video data comprising the field $F_n$ is film mode data. It is also applicable to determine whether it is appropriate to combine the field $F_n$ and the field $F_{n-1}$.

The present invention can more properly determine whether video data is film mode data, and further choose the appropriate de-interlacing method to process the video data properly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for detecting film mode of video data, comprising:

at least one motion estimation module, each the motion estimation module comprising:
  a pixel motion estimator receiving a first field and a second field in the video data, and performing a motion estimation operation on a target pixel region in the first field and the second field to generate a pixel motion determining value corresponding to the target pixel region; and
  a field motion decision coupled to the pixel motion estimator for generating a field motion determining value corresponding to the first field according to the pixel motion determining values; and
a film mode detector coupled to the motion estimation module for determining the film mode of the video data according to the field motion determining value corresponding to the first field;

wherein the pixel motion estimator comprises:
a pixel motion estimating unit estimating a corresponding position in the second field according to the target pixel region of the first field, and generating an estimating result according to the corresponding position and the position of the target pixel region; and a first determining unit coupled to the pixel motion estimating unit for generating the pixel motion determining value according to the estimating result.

2. The apparatus of claim 1, wherein the estimating result comprises a motion vector and a difference value.

3. The apparatus of claim 2, wherein the first determining unit is a first threshold for comparing the difference value and a first threshold value to generate the pixel motion determining value representing whether the target pixel region of the first field has motion.

4. The apparatus of claim 1, wherein the field motion estimator comprises:

a field motion estimating unit generating an accumulating value according to the pixel motion determining values; and a second determining unit coupled to the field motion estimating unit for generating the field motion determining value according to the accumulating value.

5. The apparatus of claim 4, wherein the accumulating value represents the number of target pixel regions in the first field that have motion.

6. The apparatus of claim 4, wherein the field motion determining unit is a second threshold utilized for comparing the accumulating value and a second threshold value to generate the field motion determining value representing whether the first field has field motion.

7. The apparatus of claim 1, wherein the film mode of the first field represents whether it is appropriate to combine the first field and the second field.

8. The apparatus of claim 1, wherein the apparatus receives three adjacent fields from the video data, the number of the motion estimation modules is three, and the film mode detector determines the film mode of the video data according to the field motion determining values from the three motion estimation modules.

9. The apparatus of claim 1, wherein the target pixel region is a single pixel.

10. The apparatus of claim 1, wherein the target pixel region comprises a plurality of pixels.

11. A method for detecting film mode of video data, comprising:

receiving a first field and a second field in the video data;

estimating a possible position of a target pixel region in the second field according to the target pixel region of the first field:

generating a estimating result according to the possible position and the position of the target pixel region;

generating a pixel motion determining value corresponding to the target pixel region of the first field corresponding to the according to the estimating result;

generating a field motion determining value according to the pixel motion determining values; and determining the film mode according to the field motion determining value corresponding to the first field.

12. The method of claim 11, wherein the estimating result comprises a motion vector and a difference value.

13. The method of claim 12, further comprising:

comparing the difference value and a first threshold value to generate the pixel motion determining value representing whether the target pixel region of the first field has motion.

14. The method of claim 11, the step of generating the field motion determining value farther comprising:

counting the pixel motion determining value to generate an accumulating value; and generating the field motion determining value according to the accumulating value representing the number of target pixel regions in the first field that have motion.

15. The method of claim 14, further comprising:

comparing the accumulating value and a second threshold value to generate the field motion determining value representing whether the first field has field motion.

16. The method of claim 11, further comprising:

receiving three adjacent fields from the video data;

generating a first, a second, a third field motion determining values according to three adjacent fields; and determining the film mode of the video data according to the first, the second, the third field motion determining values.

17. The method of claim 11, wherein the target pixel region comprises a plurality of pixels.

18. The method of claim 11, wherein the target pixel region is a single pixel.

19. An apparatus for detecting film mode of video data, comprising:

at least one motion estimation module, each the motion estimation module comprising:

a pixel motion estimator receiving a first field and a second field in the video data, and performing a motion estimation operation on a target pixel region in the first field and the second field to generate a pixel motion determining value corresponding to the target pixel region; and a field motion decision coupled to the pixel motion estimator for generating a field motion determining value corresponding to the first field according to the pixel motion determining values; and a film mode detector coupled to the motion estimation module for determining the film mode of the video data according to the field motion determining value corresponding to the first field;

wherein the field motion decision comprises:

a field motion estimating unit generating an accumulating value according to the pixel motion determining values; and a second determining unit coupled to the field motion estimating unit for generating the field motion determining value according to the accumulating value.

20. The apparatus of claim 19, wherein the accumulating value represents the number of target pixel regions in the first field that have motion.

21. The apparatus of claim 20, wherein the field motion determining unit is a second threshold utilized for comparing the accumulating value and a second threshold value to generate the field motion determining value representing whether the first field has field motion.

22. A method for detecting film mode of video data, comprising:

receiving a first field and a second field in the video data;

performing a motion estimation operation on a target pixel region in the first field and the second field to generate a pixel motion determining value corresponding to the target pixel region of the first field;

counting the pixel motion determining value to generate an accumulating value;

generating a field motion determining value according to the accumulating value representing the number of target pixel regions in the first field that have motion; and determining the film mode according to the field motion determining value corresponding to the first field.

23. The method of claim 22, the step of generating the field motion determining value comprising:

comparing the accumulating value and a second threshold value to generate the field motion determining value representing whether the first field has field motion.

* * * * *